(12) United States Patent
D'Alessandro

(10) Patent No.: US 6,556,974 B1
(45) Date of Patent: Apr. 29, 2003

(54) METHOD FOR EVALUATING CURRENT BUSINESS PERFORMANCE

(76) Inventor: Alex F. D'Alessandro, 2140 Long Bow La., Clearwater, FL (US) 33764

(*) Notice: Subject to any disclaimer, the term of this patent is extended or adjusted under 35 U.S.C. 154(b) by 0 days.

(21) Appl. No.: 09/223,426

(22) Filed: Dec. 30, 1998

(51) Int. Cl.⁷ .............................................. G06F 17/60
(52) U.S. Cl. .......................................... 705/10; 705/11
(58) Field of Search ................................. 434/236, 237, 434/238, 322, 323, 362; 705/10, 11

(56) References Cited

U.S. PATENT DOCUMENTS

| | | | |
|---|---|---|---|
| 4,451,700 A | * 5/1984 | Kempner et al. | 179/2 |
| 4,937,439 A | * 6/1990 | Wanninger et al. | 235/456 |
| 4,992,939 A | * 2/1991 | Tyler | 364/408 |
| 5,218,535 A | * 6/1993 | Pietrowski | 364/419 |
| 5,365,425 A | * 11/1994 | Torma et al. | 364/401 |
| 5,551,880 A | * 9/1996 | Bonnstetter et al. | 434/236 |
| 5,684,964 A | * 11/1997 | Powers et al. | 364/401 |
| 5,717,865 A | * 2/1998 | Stratmann | 395/210 |
| 5,726,914 A | * 3/1998 | Janovski et al. | 364/552 |
| 5,737,494 A | * 4/1998 | Guinta et al. | 395/10 |
| 5,740,035 A | * 4/1998 | Cohen et al. | 364/401 |
| 5,893,098 A | * 4/1999 | Peters et al. | 705/10 |
| 6,007,340 A | * 12/1999 | Morrel-Samuels | 434/236 |

OTHER PUBLICATIONS

Bohoris, A Comparative Assess. of Some Major Quality Awards, 1995.*
Internat'l Journal of Quality & Rel. Mgmt v12n9 pp 30–43.*
Greengard, Achieving Greater Intranet Eff. . . . , Workforce, v77, n9, p 72(5), Sep. 1998.*
Paul, Karen and David Bracken. Everything You Always Wanted to Know About Employee Surveys. Training and Development, vol. 49, Issue 1, p. 45, Jan. 1995.*
Zatz, David. Create Effective E–Mail Surveys. HR Magazine, vol. 45 Issue 1, p. 97, Jan. 2000.*
Callahan, Thomas. Comparisons of the Competitive Position of Canadian, Mexican, and U.S. Suppliers. Journal of Supply Chain Management. Vol. 36, #4, p. 43–54, Fall 2000.*
Bradley, Peter. How One Baldridge Winner Uses Suppliers to Achieve Quality. Purchasing. vol. 115 #8 p. 13–16, Nov. 1993.*
Singh, Jagdip. Performance Productivity and Quality of Frontline. Journal of Marketing. vol. 64, Issue 2, p. 15–34, Apr. 2000.*

(List continued on next page.)

*Primary Examiner*—Vincent Millin
*Assistant Examiner*—Steven Wasylchak
(74) *Attorney, Agent, or Firm*—Andrew C. Greenberg; Carlton Fields, P.A.

(57) ABSTRACT

A system for providing accurate, quantifiable and reproducible assessments of an organization's performance based on predetermined criteria. The system includes a telecommunications infrastructure administered by a survey administrator. Employees or non-employees of a company or other organization to be evaluated log on to the system and answer a plurality of questions relating to various aspects of the business entity's operations. The information may be obtained through Internet communications, through touch-tone telephone systems, and in many other ways including the use of personal computers, diskettes and email, or even manually including the use of pencil and paper where penciled-in answers are read by a scanner. The data is stored in a database and subsequently analyzed by the survey administrator for evaluation and forecasting of the business entity's performance.

24 Claims, 3 Drawing Sheets

OTHER PUBLICATIONS

Jolls, Tessa. Technology Continues to Redefine HR's Role. Workforce, vol. 76, #7, p. 46(11), Jul. 1997.*

Decisive Technology Announces Decisive Answers for Human Resources; a One Stop Employee Information Gathering Solution for HR Professionals, Business Wire. p. 3110061, Mar. 1997.*

Stanton, Jeffrey. Personnel Psychology, vol. 51, #3 p. 709–725, 1998.*

Minard, Bernie, An Online User Satisfaction Survey, Computers in Healthcare, vol. 10, #1, p. 44(3), Jan. 1989.*

Employees' Attitudes. Supervision, vol. 53, #1, p. 11 (1), Jan. 1992.*

Remote LAN Access Software: Ordering Take–Out LAN. Infoworld, vol. 18, #9, p. 66(8), Feb. 1996.*

Paul, Karen and Bracken, David. Everything You Always Wanted to Know About Employee Surveys. Training and Development, vol. 49, issue 1, p. 45, Jan. 1995.*

* cited by examiner

1. Do senior leaders guide the company in setting direction and sustaining effective leadership through the organization?
   ○ Yes
   ● No Senior leaders *fully guide* and sustain effective leadership.
   ○ Almost Always Disagree
   ● Rarely Agree (20%)
   ○ Seldom Agree (35%)
   ○ Agree (50%)
   ○ Mostly Agree (65%)
   ○ Strongly Agree (80%)
   ○ Almost Always Agree

[NEXT >>]

| Scores for a Sample Organization | | | |
|---|---|---|---|
| Evaluation Categories | Total Points | Percent of Total Points | Points Earned |
| 1. Leadership | 110 | 38.2 | 42 |
| 2. Strategic Planning | 80 | 43.8 | 35 |
| 3. Customer and Market Focus | 80 | 40 | 32 |
| 4. Information and Analysis | 80 | 25 | 20 |
| 5. Human Resource Focus | 100 | 44 | 44 |
| 6. Process Management | 100 | 36 | 36 |
| 7. Business Results | 450 | 35.6 | 160 |
| Totals | 1,000 | 36.9 | 369 |

US 6,556,974 B1

METHOD FOR EVALUATING CURRENT BUSINESS PERFORMANCE

BACKGROUND OF THE INVENTION

1. Field of the Invention

The present invention relates generally to a survey system and apparatus for evaluating the results. More particularly, it relates to a remotely accessible system for the collection of employee or non-employee survey responses to quantify various criteria relating to the operation of an organization.

2. Description of the Prior Art

In an increasingly competitive marketplace, business entities strive to improve leadership, quality, customer satisfaction and other criteria that directly or indirectly relate to the ultimate profitability of the enterprise. Empirical evidence has established that business operations that excel in distinct and measurable attributes are far more likely to be profitable in commerce. As an example, the "Baldrige Index" is made up of publicly traded U.S. companies that have received the Malcolm Baldrige National Quality Award during the years 1988 to 1996. The Secretary of Commerce and the National Institute of Standards and Technology ("NIST") were given the responsibility, under Public Law 100–107, to develop and administer the Award with cooperation and financial support from the private sector. NIST "invested" a hypothetical 1,000 in each of the six whole company winners of the Baldrige Award. The investments were tracked from the first business day of the month following the announcement of award recipients (or the date they began public trading) to Dec. 1, 1997. Adjustments were made for stock splits. Another 1,000 was hypothetically invested in the Standard and Poor's Index 500 ("S&P") at the same time. NIST found that the group of six outperformed the S&P 500 by more than 2.7 to 1, achieving a 394.5 percent return on investment compared to a 146.9 percent return for the S&P 500. Therefore, it is desirable for an organization to administer periodic assessments of its operations.

The detailed assessment of a business operation is often a difficult, expensive, and time-consuming task. Typically, upper level management may knowingly or inadvertently affect the accurate measure of information gathered for the assessment. Outside consultants are often employed to interview and observe the operation of the enterprise on-site. However, management may wish to influence the data for a number of reasons. Upper level management may be greatly affected by the results of the evaluation and may attempt to direct the outside consultant only to well performing operations, shielding problem areas from discovery. In addition, the outside consultant may interview subordinate employees in the presence of their supervisor. This creates a poor environment for gaining candor from the subordinate employee on potential areas of improvement that are the responsibility of the supervisor.

An evaluation by an outside consultant may require the consultant to travel to different geographical locations to assess a large operation with continuity. The consultant may also require the employee to stop productive work to allow time for the assessment interview. It is time-consuming for an independent consultant to conduct individual employee interviews, record the data, and assemble the information into a useful form. Furthermore, should a business wish to conduct periodic evaluations, there is no guarantee that the same consultant will be available. Therefore, the company cannot be assured that the next independent assessment performed will have the same consistency. Nor is there any assurance that secondary evaluations will produce meaningful results comparable to previous exercises.

Should the company attempt to apply known economic principles to an "in-house" self-assessment, there is the potential that more harm than good may come from the endeavor. Many organizations begin the process of self-assessment with a shallow understanding of the performance criteria sought or the optimal method in which to gather the information. This self-assessment suffers from an inseparable relationship between the company's own evaluator and the upper management that may exert influence, not only on the examinees, but also on the examiner.

Previous attempts have been made to provide business-related surveys such as described in U.S. Pat. No. 5,551,880 to Bonnstetter et al. (the '880 patent) which is incorporated herein by reference. The '880 patent describes a system for predicting the potential success of an individual for a particular job or task. A survey is conducted wherein the employee or potential employee submits information on behavioral and value preferences. The information is then analyzed and compared against standards for behavior and values previously resolved for specific employment. In a preferred embodiment of the '880 patent, the behavior and value questions are administered through software and evaluated via a predetermined algorithm. However, the system analyzes the individual employee and not the business entity as a whole. Nor does the '880 patent describe an independent party to administer the survey to ensure confidentially, honesty, and a full disclosure of the employee's perceptions of the business entity.

Therefore, there is a need in the art for a method and apparatus to provide a reliable self-assessment survey process that can be easily administered and scored with the accuracy and completeness of a well developed written narrative self-assessment.

There is a further need in the art to integrate existing telecommunication technologies to avoid the time and labor intensive ordeal of the paper and pencil process or other traditional means of survey administration. This would allow the database of both individual responses and cumulative data to be completely external to the organization being assessed.

There is a further need in the art to provide confidentiality to organizations and their employees participating in the survey. This provides a distinct opportunity to benchmark the data to industry peers and to provide the objective assurance that all data is accurate and verifiable by a reliable survey administrator organization.

However, in view of the prior art in at the time the present invention was made, it was not obvious to those of ordinary skill in the pertinent art how the identified needs could be fulfilled.

SUMMARY OF THE INVENTION

The present invention solves significant problems in the art by providing a telecommunications infrastructure that supports the efficient, confidential and accurate measure of performance criteria relating to the performance of an organization. A predetermined set of performance criteria are measured by the use of an automated employee and non-employee interview system whereby recorded responses are stored in a database which is utilized for a quantitative evaluation of various aspects of a business enterprise.

The present invention comprises an array of survey questions for evaluating a plurality of predetermined criteria relating to the performance of an organization. A survey administrator controls a data-gathering interface means for employees or non-employees of the business to confidentially record answers to the survey questions. For each individual employee survey, the data-gathering interface records the employee's identification, their job classification and a business identifier. Pertinent data is also collected for each non-employee participating in the survey. The data-gathering interface may comprise an Internet web server, a touch-tone telephone entry system, a paper and pencil system that compiles the answers by scanning them automatically, and other existing or to-be-developed interface means as well. For example, an additional data-gathering interface means could be provided in the form of a personal computer having appropriate software. A respondent could save his or her survey responses on a diskette and mail the diskette to the survey administrator, or email the responses to the survey administrator as an attached file. This would enable a respondent to prepare answers and send them to the survey administrator while the respondent is on a flight, on the road, or otherwise away from a permanent office environment.

The survey administrator maintains a database of the responses to the survey questions and has the ability to archive past response data. The survey administrator then applies a selected formula to the survey data to evaluate the performance of the organization and produces a quantifiable result based on a plurality of business categories.

In a preferred embodiment, an organization wishing to evaluate the performance of various key aspects of its operations selects one or more business performance models. Each business performance model is measured using predetermined questions for employees of the business. A survey administrator performs the administration of the predetermined questions so that confidentially in the interview process insures candid answers to the questions. In one embodiment, responses to the questions are gathered utilizing an Internet web server and are stored either locally on the server or at a remote location for the survey administrator to later compile and analyze. The web server provides the opportunity to quickly and efficiently gather information, particularly where various offices of an organization are separated by substantial geographic distance. The web server also may operate 24 hours per day at relatively low cost and permit a plurality of employees to enter in responses at the same time.

In an alternative embodiment, a telephone system utilizing dual-tone multi-frequency ("DTME") input provides a means for employees to confidentially record information relating to the performance of a company. The DTMF entry has the advantage of not requiring the employee to have a machine capable of accessing the web server over the Internet. Using DTMF entry, the employee logs on using a code provided by the survey administrator. Once within the telephone system, pre-recorded questions are audibly played to the employee. At the conclusion of each question, the employee is prompted to record their response by depressing numerals on the telephone.

In another embodiment, non-employees participate in the survey as well. However, the questions propounded to non-employees may differ from the questions propounded to employees.

The data is readily compiled into a useable database format. At the conclusion of the data gathering stage, the survey administrator can easily analyze the recorded information and produce a report to the business entity evaluating the entity based on the pre-selected business performance criteria desired. Furthermore, the operation of the invention is highly reproducible and consistent. A baseline assessment can be repeated over time, allowing the organization to track quantifiable results and improvements.

It should be noted that the current invention has a wide range of applications which may include health care accreditation, educational institution assessment, and similar tasks. For example, the current invention may be applied to a Performance-based Organizational Effectiveness & Efficiency Tracking Program ("POET") wherein the organizational effectiveness and efficiency of child welfare organizations are measured in addition to performance indicators essential to success in a managed care environment.

An advantage of the invention is that a complete assessment of a large corporation may be completed more rapidly and efficiently than using independent consultants that interview onsite. The reduced costs and speed permit a business to conduct more frequent performance evaluations that can be utilized to operate the business more profitably.

Another advantage of the invention is that employees of the business are provided with the opportunity to submit honest and candid answers to potentially sensitive questions. Because the opportunity for external influence to affect the employee's response is curtailed, the final evaluation of the business entity is more likely to uncover problem areas in its operations that may be subsequently improved.

Another advantage of the invention is that the infrastructure of the evaluation is highly consistent over time. This permits the business entity to periodically measure itself against previous assessments.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
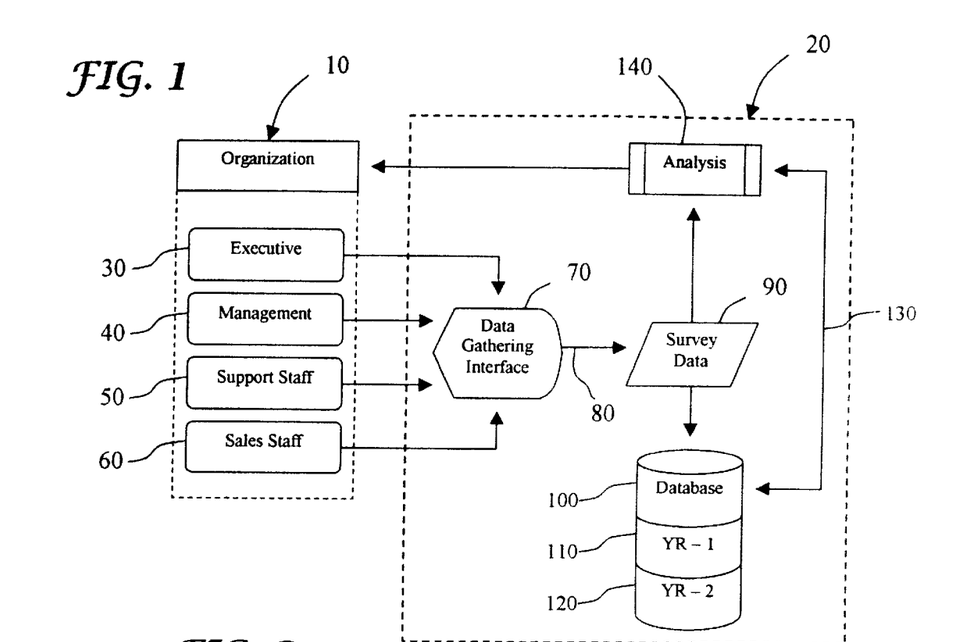
FIG. 1 is a diagrammatical view of the survey process according to the invention.

Referring initially to FIG. 1, it will there be seen that the organization subject to the survey is denoted by the reference number 10 as a whole. Virtually all business entities have the following job classifications: executive staff 30, management staff 40, support staff 50, and customer contact staff 60 as integral employee components which support most all business functions of the enterprise. It is each of these job classifications of employees who form the internal pool of respondents of the business entities. The login procedures for these internal respondents will be discussed in more detail later.

In another embodiment of the invention, an external pool of respondents is also included. The external pool of respondents may include consumers, customers or clients of the business entity, i.e., those who are not employees or otherwise a part of the internal group of respondents. The external pool of respondents may also be adjusted as desired to include members of the board of directors or trustees, suppliers or vendors, people who perform outsourced operations, competitors, partners, consultants, or any other relevant external respondent entity. The login procedure for these external respondents is similar to the login procedure for internal respondents, except that said login procedure identifies all members of the external pool of respondents as such and by their specific category such as customer, vendor, or the like. External respondents may also be queried as to their age, frequency of contacts with the business entity, and other information deemed pertinent.

In many organizations there are one or more consultants or holders of other job titles who are on the business premises daily and whom might seem to be employees of the organization even though they are technically independent contractors. There are other jobs as well where the distinction between employee or non-employee may not be easily ascertainable. This invention does not depend upon any legal analysis of who should be considered internal or external to the organization as a matter of legal definition because in some cases a non-employee such as an outside consultant might best be included as a member of the internal pool of respondents for survey purposes. Therefore, for convenience purposes, and not in any strict legal sense, the members of the pool of internal respondents are herein deemed employees of the organization, and the members of the pool of external respondents are herein deemed non-employees of the organization. A survey administrator is free to determine the respective members of the pools of internal and external respondents in any way that best serves the purposes of the survey without regard to strict legal determinations of the legal status of the individual members of either pool.

The system obtains information from individual employees or other respondents regarding their perception of performance criteria existing in the workplace. This is accomplished by utilizing a performance criteria survey. This survey is administered and controlled by a survey administrator denoted 20. The survey data is obtained by a data-gathering interface 70. The data-gathering interface may comprise a variety of telecommunication mediums which may include touch-tone telephone systems, hypertext language format ("HTML") Internet web servers, client-server wide area networks ("WANs") or local area networks ("LANs"). Data-gathering interface 70 acts as a conduit to receive survey data 90 in response to a plurality of predetermined survey questions. Each question contains several important aspects of a business function linked to vital performance abilities of the organization.

The results of the survey are stored in a database 100 for a baseline analysis of performance criteria and may also be used longitudinally in later intervals of time. Prior survey data from prior years 110 and 120 may be archived by the survey administrator 20 and later utilized as a base-line reference to the current evaluation of the organization. Once a requisite number of respondents or all respondents complete surveys, an analysis 140 is performed on the survey data 90 by the survey administrator 20 and then communicated back to the organization 10.

Figure 2:
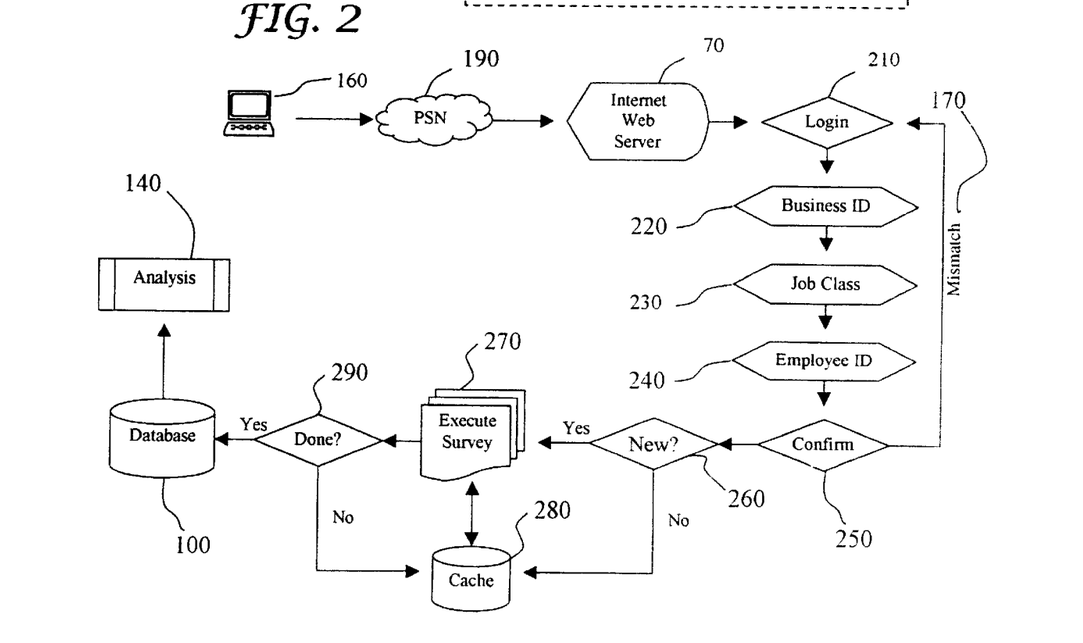
FIG. 2 is a diagrammatical view of an Internet-based method of retrieving and recording employee responses.

FIG. 2 provides an overview of an Internet-based data and tracking system. A remote user terminal 160 accesses an Internet web server 70 through a public switched network ("PSN") 190. The survey administrator 20 provides the organization 10 with a series of codes for the login 210 and test administration to begin. Typically, the organization 10 will choose an alphanumeric password of ten digits or less for identification of the organization 10 as a whole. The survey administrator 20 records said password and opens it for usage in protected area of the website. Next the survey administrator 20 assigns a chronological range of numbers sufficient to match the total number of respondent employees or non-employees elected and eligible to sit for the survey. To begin the login 210 process, the respondent accesses the world wide web and web server 70 using its uniform resource locator ("URL"). The URL may be provided as a numerical-based Internet protocol ("IP") address or may be accessed by a registered domain name via a domain name server ("DNS").

It should also be noted that alternatives to web-based Internet communications may be employed. The alternatives may include 3270 emulation, VT-100, ASCII or separate client-server applications.

In a preferred embodiment, the first web page that appears offers an overview of the survey system, including its methodology of data collection, processing and aggregation. This page also offers the user a link to proceed directly to the test. When this option is chosen a new screen appears which displays test selection criteria with a sample Likert scale. At the bottom of this screen, the user is prompted to complete three empty fields for password protection entry. The first field is for the business ID 220 password that represents a unique identification of the organization. The second field is for job classification entry 230 that may include coding for employee classifications of executive staff 30, management staff 40, support staff 50 or direct customer contact staff 60. It may also include coding for external respondents, mentioned above, such as customers, suppliers, and the like, and there may be a different code, if desired, for each category of external respondents. The third field is for a unique employee ID 240 that relates to the preset numbers matching the number of employees as indicated above.

Once this information is entered a confirmation process 250 is triggered that compares this keyed-in information to the information on server 70. If a match is detected the server then determines as at 260 if the user has previously initiated the survey. If the user has previously initiated the survey, a cache 280 record of the user's answers is accessed and the user is only presented with the survey questions that were not answered.

If a mismatch 170 in passwords is detected during the login process 210, an error screen is displayed and the user has the ability to reenter the three identification codes 220, 230, and 240. It should be noted that additional fields may be added to the login process which may include length of employment, demographics and other data. Alternatively, a single login ID may be utilized which individually identifies the employee's organization, job classification and personal identification.

Upon successful login 210 and confirmation 250, the survey is commenced as at 270 with a series of questions presented in HTML format. Under each question is a form input section coded in HTML which may comprise a check box, radio button, or edit box. Alternatively, other input means compatible with the user's web browser may be utilized including ActiveX or Java. Responses to the input means are stored in a database 100 that may reside on the web server or at a remote location. The questions and answer input forms may be configured on a single scrollable page or on individual HTML pages joined by hyperlinks.

Figure 3:
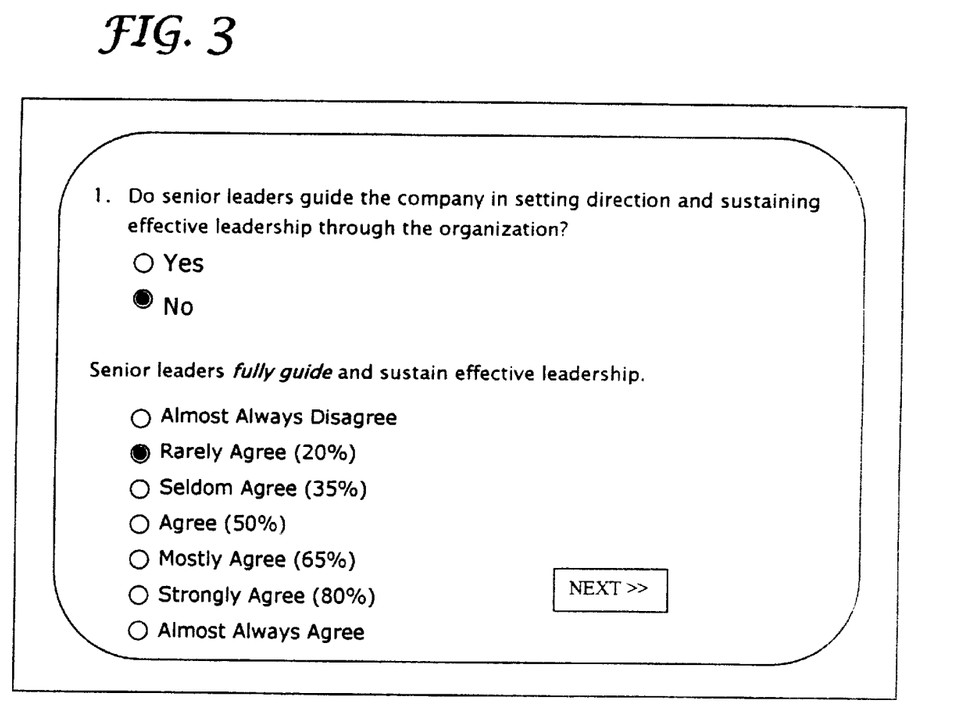
FIG. 3 is an illustrative example of a survey question presented to a user from an Internet web server.

FIG. 3 discloses a sample question screen as viewed through an Internet web browser comprising a plurality of input sections to each survey question topic. Users are prompted to respond to each of the questions in one or more components. In the following example, there are three components. Component A queries whether the respondent believes a specific performance criteria exists in their workplace. Component B queries the respondent to weigh their level of agreement or disagreement to a functional extrapolation of component A. Component C asks the respondent to check one of many methods how such a performance criteria could be improved.

In the example of FIG. 3 two question components are presented. Question 1 proposes a query on the perceived leadership skills in the company and provides for a Boolean response. The first query is followed up by another query that requests a quantified response with seven possible entries. In the preferred operation of the Internet system, none of the responses are selected when the user first downloads the page to their web browser. Each response must be completed for the "next question button" to become available for next question cueing and for the responses of that user to be filed in the database 100. Should the user attempt to skip over the questions without responding, the internal controls validate whether a response has been entered and repeat the same page to the user until a completed response is received by the web server. In a preferred embodiment, JavaScript is utilized to validate completed responses. The question-to-question responses are temporarily stored in a cache 250 until all survey questions are completed and the data is then committed to database 100 for analysis. An interrupt feature is available to all respondents who are unable to finish the survey in one sitting. If the respondent stops and logs off, he or she may restart the survey at any later time, by simply re-entering the password, job classification code and test ID. This procedure opens an incomplete survey and restores it to the last position or next available question from data stored in cache 250. When all questions are completed and a "save last answer question" button is selected, the survey is flagged as done 260 for final database 100 entry. Analysis 140 is available when all users complete their survey. Data from this part of the survey helps the organization evaluate the current level of organizational consistency about perceptions of effectiveness and efficiency between and among different levels of staff, across all operations, between staff members, and between and among the pool of external respondents as well, if any. As improvements are made the organization can re-visit the assessment in future years to track scores in key areas, to monitor improvements and to encourage greater performance. A score card system also provides a context for an organization's scores to be compared to the respective scores of other organizations.

Figure 4:
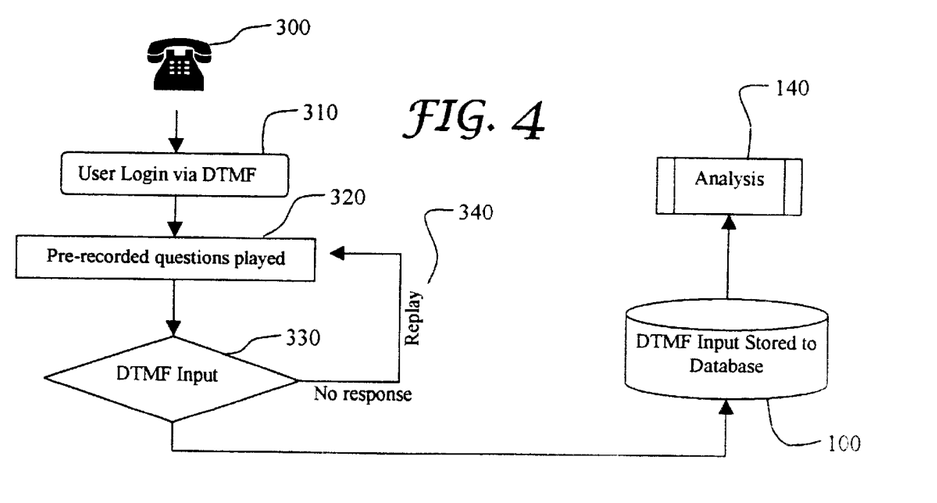
FIG. 4 is a diagrammatical view of a telephone-based method of retrieving and recording employee responses.

In the touch-tone telephone embodiment shown in FIG. 4, the questions are audibly prerecorded for playback. The employee or non-employee is given a telephone number to call with a set of access codes which may comprise a business ID, job classification and employee ID, if applicable, as described in connection with FIG. 2. The user dials into the system from a standard touch-tone phone 300. The user is prompted for each identifier which is entered by pressing the numbers of the touch-tone telephone. When a key is pressed on a touch-tone telephone, a DTMF signal is emitted which is correlated to the numeral on the keypad by a system processor. These systems are widely used in automatic call distributor ("ACD") systems utilized by call centers and by banks and financial institutions to provide automated account information. In the example, after the user is authenticated prerecorded segments 320 of the survey are played back to the user. As an option, the user may press the STAR (*) or POUND (#) key on their telephone to repeat the last playback segment. After a survey question is audibly presented to the user, the user then may answer the question depending on the response options using a DTMF input 330. For a Boolean question which requires a "yes" or "no" response, the user may be prompted to press "1" for "yes" or "2" for "no." Alternatively, should the survey question require a quantitative response, the user may be prompted to enter a range of numbers on the telephone keypad. For example, should the user "Almost Always Disagree," they would depress "1." If the user "Rarely Agrees," they would depress "2." The scale may continue so that should the user "Almost Always Agrees," they would depress "7." However, it should be noted that the telephonic entry is not limited to single digits. For example, should the user be required to indicate a percentage numeral of 55%, the entry may be executed by depressing in sequence: "5," "5," and then the "#" key. Should the user fail to respond to the system with a DTMF signal 330 within a predetermined period of time, the system may replay as at 340 the previous question proposed.

Both the Internet-based and telephonically-based system preferably time-stamp the entries wherein each time a response is posted to the web server or entered into the telephone system, a corresponding record of the date and time is also stored in the database. This may be utilized for an assessment of the amount of time needed on average to complete the evaluation and when each employee submitted their responses to the survey.

Figure 5:
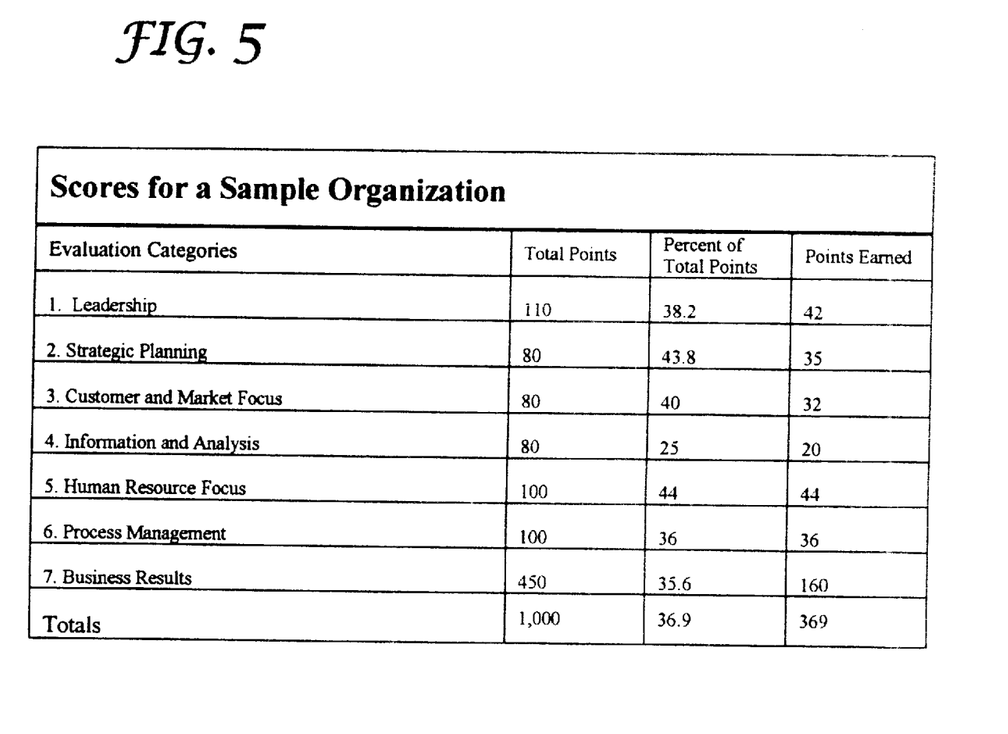
FIG. 5 is an illustrative example of an organization's performance scorecard based on the Malcolm Baldrige criteria.

FIG. 5 illustrates a diagrammatical overview of an organization's total quality output scorecard based on the Malcolm Baldrige criteria. However, other performance measurements and formulas may be applied within the scope of this invention. The purposes of the Baldrige Assessment are to promote an understanding of the requisites for performance achievement and competitiveness for business entities and to promote the sharing of information on successful business practices. The Baldrige Assessment consists of seven criteria: (1) leadership, (2) strategic planning, (3) customer and market focus, (4) information and analysis, (5) human resource development and management, (6) process management, and (7) business results.

Leadership is evaluated by the ability of senior executives to guide the company and how the company addresses it responsibilities. Strategic planning examines how the company sets strategic directions and how it determines key action plans. Customer and market focus examines how the company determines the requirements and expectations of customers and markets. Information analysis examines the management, effective use, and analysis of data and information to support key company processes and the company's performance management system. Human resource development and management examines how the company enables its workforce to develop its full potential and how the workforce is aligned with the company' objectives. Process management examines aspects of how key production, delivery and support processes are designed, managed, and improved. Business results are examined by the company's performance and improvement in its key business areas: customer satisfaction, financial and marketplace performance, human resources, supplier and partner performance, and operation performance. Business results are also evaluated by the performance of the company relative to its competitors.

In a preferred embodiment, each question has both a yes/no and weighted score component so that data can be accurately tallied with sophisticated analysis and report generation. Instead of using a simple 1–5 Likert scale which is subject to a wide range of interpretation, the current invention uses quantified behavioral descriptors, dramatically increasing score reliability. As previously illustrated in FIG. 3 a written question is followed by a quantified (percentage-tagged) behavioral description. This form of test construction yields an increase in the consistency and accuracy of ratings as well as greater coherence of linkages between business processes. The method of utilizing a written question followed by a quantified description is well known in the health care industry. In health care it was discovered that by obtaining input this way from a cross section of functions and levels throughout the organization, a performance profile can be developed that not only identifies strengths and areas for improvement, but deployment gaps as well. This is something that written narrative assessments alone do not effectively provide. Accurate survey data, based on behavioral follow-up questions, can be used to compare or benchmark organizations within and among industries, and can also support longitudinal performance studies.

The system represents an item by item, group by group, performance improvement digest that allows management the ability to recognize the linkage between performance of key processes to quality improvement outcomes (including the future allocation of resources to achieve such outcomes).

The system does this by compiling each respondent's raw data and generating a written digest of an organization's strengths and opportunities for improvement. Data is gathered and assembled to provide an organization with a detailed analysis in the form of a printed report. Responses in the database 100 are analyzed as at 140 and reported in several ways. The database table is constructed to include vertical columns formatted with mathematical formulas representing yes or no response totals, raw Likert averages, adjusted Likert averages and Organizational Success Ratios ("OSRs"). Dividing the adjusted Likert by the raw Likert produces an OSR. This number can be represented in the form of a ratio or quotient and generally as a two place decimal ranging from 0.01 to a perfect 1.00. The OSR is used to profile the system's highest and lowest scores in performance improvement, representing current quality strengths and weaknesses in the business entity.

The OSR data collected from the employees and non-employees, if any, is consistent across the organization. The results can present a clear profile of strengths and current weaknesses from which the business entity can plan appropriate actions. Each OSR is then converted to a Baldrige equivalency formula that converts the two place decimal point to a percentage. The percentage number is then applied line by line to re-create the points available in each section found in the sample table. The "maximum" points for each category of the Malcolm Baldrige National Quality Award is listed with the actual score.

As illustrated in FIG. 5, a maximum of 450 points for the "business results" category may be obtained, even if the sample organization returned only 160 points. To convert each business category result to a ratio, the total points achieved in each category is divided by the overall maximum number of points possible for the category. Thus, 160 divided by 450 equals 0.356 or 35.6 percent. By converting each business category measurement to a ratio, the organization may easily obtain a quantifiable assessment of its performance.

It will be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method reliant upon anonymous responses to survey questions for quantifying predetermined criteria relating to the performance of an organization, comprising the steps of:

providing a library of performance assessment surveys where each performance assessment survey includes a plurality of survey questions;

providing a plurality of pools of respondents;

providing an automated survey administrator;

enabling said automated survey administrator to customize a survey by preselecting a performance assessment survey from said library of performance assessment surveys;

further enabling said automated survey administrator to customize a survey by preselecting a pool of respondents from said plurality of pools of respondents;

further enabling said automated survey administrator to conduct multiple surveys simultaneously where each survey is directed to a different pool of respondents;

authenticating each member of a pool of respondents before enabling each member to answer said survey questions;

acquiring information about each respondent that identifies what knowledge about the organization is held by said respondent;

presenting survey questions to each respondent that call for information held by said respondent, and selecting said survey questions from a plurality of said performance assessment surveys if the knowledge of said respondent indicates an ability to answer said survey questions;

providing a data-gathering interface connected to a global computer network by means of a remote web server, thereby enabling said pool of respondents to individually record answers to said survey questions in private and with anonymity;

providing a database containing answers submitted by said pool of respondents;

providing a predetermined formula for evaluating said answers;

producing a quantified result, using said predetermined formula, based on said predetermined performance criteria;

storing said quantified result in said database;

retrieving from said database quantified results previously stored therein from earlier performance assessment surveys for comparison purposes;

said step of retrieving fierier including the step of enabling said automated survey administrator to preselect quantified results from said earlier performance assessment surveys;

wherein said automated survey administrator preselects which performance assessment surveys will be utilized, based upon the respective knowledge held by respondents in said pools of respondents;

wherein said automated survey administrator preselects what pool of respondents will be enabled to participate in the survey;

wherein said automated survey administrator conducts plural surveys simultaneously, directing a different survey at each pool of respondents and wherein said automated survey administrator directs a plurality of surveys to any preselected pool of respondents;

wherein said automated survey administrator preselects what comparisons of quantified rests will be made;

wherein the respondents are enabled to answer said questions in private and in anonymity; and wherein the quantified results of said performance assessment are available immediately after the performance assessment in commenced.

2. The method of claim 1, wherein the step of providing a remote web server to record said answers further comprises the steps of;

enabling individual members of said predetermined pool of respondents to access a website server over said global computer network;

displaying predetermined survey questions in the form of a question and answer sheet at a website hosted by said website server;

enabling said individual members of said predetermined pool of respondents to answer said survey questions by inputting information into said question and answer sheet; and inputting said information into said database.

3. The method of claim 2, wherein said global computer network is accessed by a wired computing device such as a personal computer.

4. The method of claim 2, wherein said global computer network is accessed by a wireless hand-held appliance.

5. The method of claim 1, further comprising the step of providing a Boolean response to said survey questions followed by a quantified response to the same survey topic.

6. The method of claim 1, further comprising the step of including the Malcolm Baldrige National Quality Award Criteria as defined by the United States National Institute of Standards and Technology as one of said performance assessment surveys.

7. The method of claim 1, further comprising the step of resolving said quantified result by:

scoring the survey responses relative to a predetermined score based on determination on the importance of each performance criteria;

correlating the survey responses for performance criteria categories into distinct arrays of data;

adding numerical values to said arrays of data representing separate performance criteria categories; and dividing said numerical values by a maximum theoretical value of said performance criteria category.

8. The method of claim 1, further comprising the step of enabling said automated survey administrator to further customize a survey by parsing said performance assessment surveys to create a survey that incorporates preselected features of said performance assessment surveys.

9. The method of claim 1, further comprising the step of enabling said automated survey administrator to further customize a survey by preselecting a pool of respondents from a plurality of pools of respondents.

10. The method of claim 1, wherein the step of providing a plurality of pools of respondents includes the steps of providing a pool of executives of said organization, a pool of managers of said organization, a pool of shareholders of said organization, a pool of employees of said organization, a pool of customers of said organization, a pool of vendors of said organization, a pool of government regulators that enforce laws relating to said organization, and a pool of members of the general public so that said human survey organizer may further customize a survey by selecting any combinations of pools or respondents.

11. The method of claim 1, further comprising the step of enabling members of said preselected pool of respondents to anonymously provide answers to said survey questions by inputting answers into a web page under the control of said automated survey administrator.

12. The method of claim 1, further comprising the step of enabling members of said preselected pool of respondents to anonymously provide answers to said survey questions through a wired computing device such as a personal computer and by a wireless hand-held Internet appliance under the control of said automated survey administrator.

13. The method of claim 1, further comprising the step of enabling members of said preselected pool of respondents to anonymously provide answers to said survey questions by manually completing an answer sheet.

14. The method of claim 1, further comprising the steps of:

enabling said automated survey administrator to preselect a pool of respondents from multiple categories of respondents, including executives, managers, employees, customers, shareholders, vendors, government regulators, and members of the general public.

15. The method of claim 1, further comprising the step of enabling said automated survey administrator to authenticate each member of a preselected pool of respondents before allowing such member to answer said survey questions.

16. The method of claim 1, further comprising the step of enabling the automated survey administrator to educate each respondent about predetermined aspects of the performance assessment method so that each respondent may provide better educated answers to the survey questions propounded by the automated survey administrator.

17. The method of claim 16, wherein the step of enabling the automated survey administrator to educate each respondent about predetermined aspects of the performance assessment method further includes the steps of:

providing pre-survey interactive training that educates individual respondents about each question and the entire survey;

providing a pre-survey on-line tutorial that is automatically scored and formatted to pre-qualify the respondent to sit for the survey; and providing plural assistance options for answering concurrent survey questions accurately in-real time so that respondents will better understand the survey questions and thus provide more meaningful answers.

18. The method of claim 1, further comprising the step of linking preselected self-assessment criteria to a performance assessment survey and employing statistical inference to estimate future expected values for management-specified performance indicators.

19. The method of claim 1, further comprising the step of inter-rating the respondents to identify those who give answers that may be disregarded.

20. The method of claim 19, further comprising the step of classifying according to a predetermined statistical determination the reliability of responses relative to underlying biases that are evaluated using conjoint analyses of responses to key questions.

21. The method of claim 1, further comprising the steps of linking together the tasks of survey building, survey taking, and analysis of results.

22. The method of claim 21, further comprising the steps of tutoring the organization in the choice of survey questions and analysis methods, developing a dialog with respondents to coach them in proper responses and assist them in the completion of the survey, conducting a real-time analysis of individual survey participant responses and accumulating said responses in a respondent data base.

23. The method of claim 1, further comprising the step of evaluating Boolean responses from respondents using a suite of multi-variate statistical methods to determine cross-participant survey trends by category of response and to establish predictive opportunities for performance improvement based on evaluated process capability ratios.

24. The method of claim 1, further comprising the step of identifying improvement areas based on process capability indices and performance gaps that are generated by comparison of survey responses to benchmark survey responses in a performance data base.

* * * * *